United States Patent
Yabuki et al.

(10) Patent No.: US 11,256,537 B2
(45) Date of Patent: Feb. 22, 2022

(54) INTERRUPT CONTROL APPARATUS, INTERRUPT CONTROL METHOD, AND COMPUTER READABLE MEDIUM

(71) Applicant: Mitsubishi Electric Corporation, Tokyo (JP)

(72) Inventors: Jun Yabuki, Tokyo (JP); Hitoshi Yamamoto, Tokyo (JP); Ryo Okabe, Tokyo (JP); Shinichi Ochiai, Tokyo (JP); Hiroki Konaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/117,830

(22) Filed: Dec. 10, 2020

(65) Prior Publication Data
US 2021/0096906 A1 Apr. 1, 2021

Related U.S. Application Data

(63) Continuation of application No. PCT/JP2018/028502, filed on Jul. 30, 2018.

(51) Int. Cl.
*G06F 9/48* (2006.01)
*G06F 9/30* (2018.01)
(Continued)

(52) U.S. Cl.
CPC ........ *G06F 9/4812* (2013.01); *G06F 9/30032* (2013.01); *G06F 9/3885* (2013.01); *G06F 13/372* (2013.01)

(58) Field of Classification Search
CPC .. G06F 9/4812; G06F 9/30032; G06F 9/3885; G06F 13/372
See application file for complete search history.

(56) References Cited

U.S. PATENT DOCUMENTS 6,748,444 B1 * 6/2004 Nagashima ........... G06F 13/387
370/231
2009/0295812 A1 * 12/2009 Aoki .................... G06F 16/9577
345/522
(Continued)

FOREIGN PATENT DOCUMENTS

JP 11-78173 A 3/1999
JP 2001-156842 A 6/2001
(Continued)

OTHER PUBLICATIONS

International Search Report (PCT/ISA/210) issued in PCT/JP2018/028502, dated Sep. 25, 2018.

*Primary Examiner* — Henry Tsai
*Assistant Examiner* — John B Roche
(74) *Attorney, Agent, or Firm* — Birch, Stewart, Kolasch & Birch, LLP

(57) ABSTRACT

An interrupt handler unit (130) generates a timer interrupt at an interrupt time, and executes an interrupt preparation process. A wait time period measurement unit (142) a measures a time period from completion of the interrupt preparation process to generation of a start request (201) as a wait time period. A time calculation unit (441) calculates a subtraction time period based on the wait time period measured by the wait time period measurement unit (142), and calculates a preparation time period that is the sum of a time period obtained by subtracting the subtraction time period from the wait time period and a processing time period of the interrupt preparation process. The time calculation unit (441) stores a time obtained by shifting back the preparation time period from the time of a next start request (201), as a next interrupt time, in a time storage unit (442).

20 Claims, 16 Drawing Sheets

(51) Int. Cl.
*G06F 9/38* (2018.01)
*G06F 13/372* (2006.01)

(56) References Cited

U.S. PATENT DOCUMENTS

| | | | |
|---|---|---|---|
| 2011/0006885 A1* | 1/2011 | Park | G06K 7/10029 |
| | | | 340/10.3 |
| 2013/0159577 A1 | 6/2013 | Fuji | |
| 2014/0304491 A1* | 10/2014 | Kasahara | G06F 9/3001 |
| | | | 712/42 |
| 2015/0242346 A1 | 8/2015 | Fuji | |
| 2018/0060275 A1 | 3/2018 | Kasahara et al. | |
| 2019/0118745 A1 | 4/2019 | Ishigooka et al. | |

FOREIGN PATENT DOCUMENTS

| | | |
|---|---|---|
| JP | 2013-97659 A | 5/2013 |
| JP | 2014-191655 A | 10/2014 |
| JP | 2017-73000 A | 4/2017 |
| JP | 2017-91589 A | 5/2017 |
| JP | 2017-199266 A | 11/2017 |

\* cited by examiner

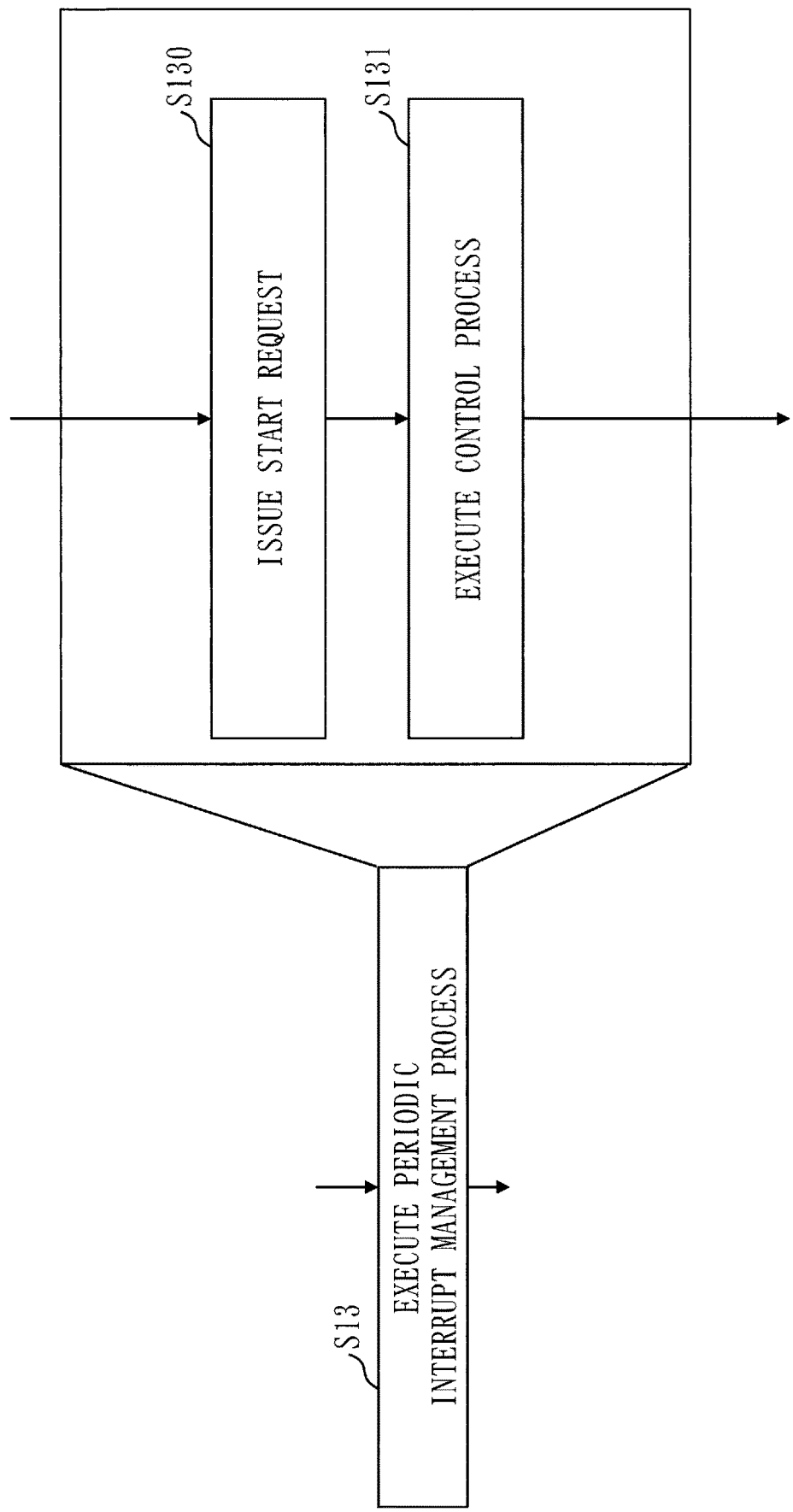

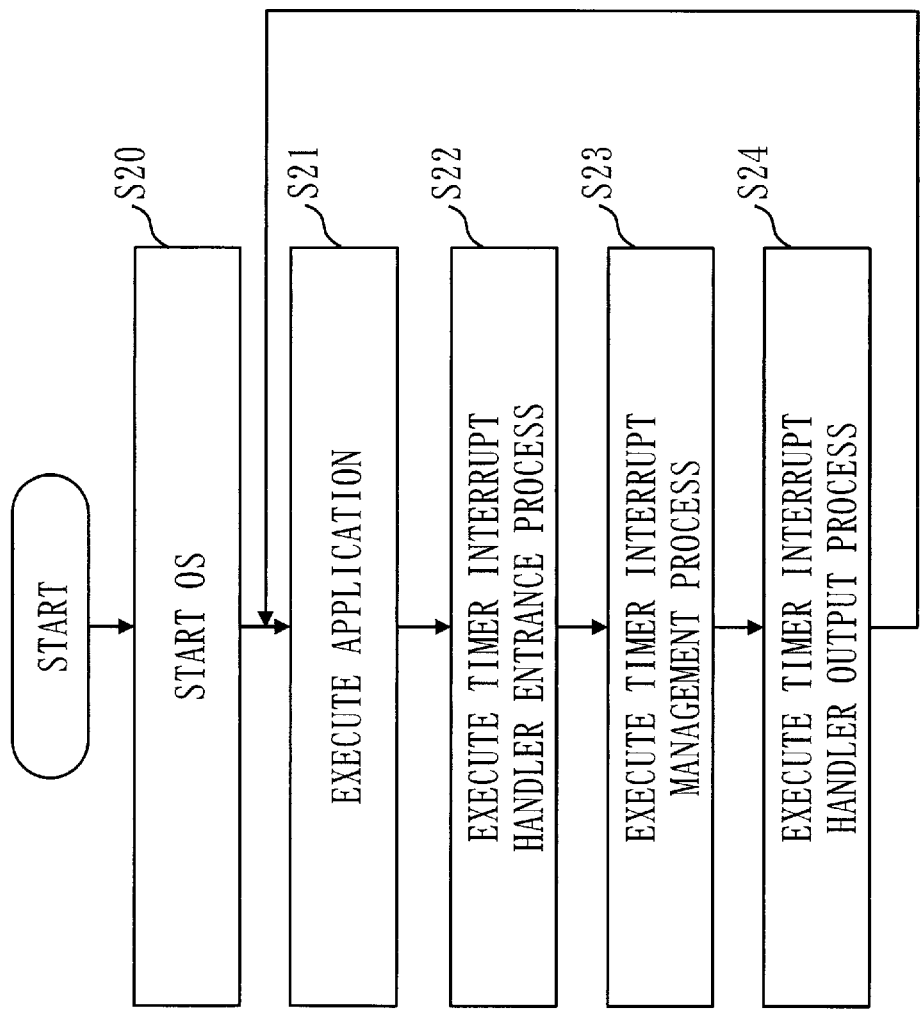

US 11,256,537 B2

INTERRUPT CONTROL APPARATUS, INTERRUPT CONTROL METHOD, AND COMPUTER READABLE MEDIUM

CROSS-REFERENCE TO RELATED APPLICATIONS

This application is a Continuation of PCT International Application No. PCT/JP2018/028502, filed on Jul. 30, 2018, all of which is hereby expressly incorporated by reference into the present application.

TECHNICAL FIELD

The present invention relates to an interrupt control apparatus, an interrupt control method, and an interrupt control program.

BACKGROUND ART

Device control is realized by periodically performing a series of steps of a control process such as input of information from a control target device, computation, and output of information to the control target device. Therefore, it is necessary to periodically generate a signal to be a start request and start the control process at the timing of the start request. Furthermore, the control process needs to be started with low latency from the timing of the start request.

By implementing the control process with an interrupt process and generating an interrupt at the timing of the start request, the control process can be started with priority over an application that is being executed. However, a preparation process such as saving context, which is performed at the entrance of an interrupt handler, causes start of the control process to be delayed from the timing of the start request. This preparation process is also referred to as an interrupt handler entrance process or an interrupt preparation process.

As described above, if the interrupt preparation process is started at the timing of the start request, the start of the control process may be delayed. Therefore, a method has been proposed in the past in which a time period required for the interrupt preparation process is measured, and the interrupt preparation process is started at a time that is earlier than the start request by that time period.

Patent Literature 1 discloses a technique in which in order to start a target process from a start time with low latency, a timer interrupt is generated at a time that is earlier than the start time by an interrupt reservation time period.

CITATION LIST

Patent Literature

Patent Literature 1: JP 2013-097659 A

SUMMARY OF INVENTION

Technical Problem

In Patent Literature 1, in order to complete the preparation process before generation of a start request, a processing time period of the preparation process needs to be measured in advance. In addition, in Patent Literature 1, a certain margin is set in the processing time period of the preparation process with a fixed value, so that a wait time period occurs. Furthermore, in Patent Literature 1, there is no arrangement to adjust the wait time period.

It is an object of the present invention to adjust an interrupt time at which a preparation process is to be started such that the preparation process is completed immediately before a start request with a minimum margin, without measuring a processing time period of the preparation process in advance.

Solution to Problem

An interrupt control apparatus according to the present invention starts an interrupt process in response to a start request generated regularly, and the interrupt control apparatus includes:

a time storage unit to store an interrupt time at which an interrupt preparation process for preparing for the interrupt process is to be started;

an interrupt handler unit to generate a timer interrupt at the interrupt time, and execute the interrupt preparation process;

a wait time period measurement unit to measure a wait time period from completion of the interrupt preparation process to generation of the start request; and a time calculation unit to calculate a subtraction time period based on the wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the time storage unit.

Advantageous Effects of Invention

In an interrupt control apparatus according to the present invention, a time calculation unit calculates a preparation time period that is the sum of a time period obtained by subtracting a subtraction time period from a wait time period and a processing time period of an interrupt preparation process, and sets a time obtained by shifting back the preparation time period from the time of a next start request, as a next interrupt time. In the interrupt control apparatus according to the present invention, the preparation time period is shortened depending on the wait time period, so that an interval between the interrupt time and the time of a start request can be shortened. Therefore, in the interrupt control apparatus according to the present invention, the interrupt time can be set such that the interrupt preparation process is completed immediately before the start request with a minimum margin.

BRIEF DESCRIPTION OF DRAWINGS

FIG. 15 is a detailed flowchart of a periodic interrupt management process according to the third embodiment; and FIG. 16 is a flowchart illustrating operation of a core-1 of the interrupt control apparatus according to the third embodiment.

DESCRIPTION OF EMBODIMENTS

Embodiments of the present invention will be described hereinafter with reference to the drawings. Throughout the drawings, the same or corresponding portions are denoted by the same reference signs. In the description of the embodiments, description of the same or corresponding portions will be omitted or simplified as appropriate.

First Embodiment

In this embodiment, an interrupt control apparatus 100 to start an interrupt process based on a start request generated regularly will be described. The interrupt control apparatus 100 starts a control process as the interrupt process in response to a start request that is input periodically from the outside. In particular, an aspect to be described in this embodiment is that an interrupt time of a timer interrupt to be generated before a next start request is predicted based on a measurement value of a wait time period when the current timer interrupt is generated. The interrupt time is also referred to as an interrupt timing.

*Description of Configurations*

Figure 1:
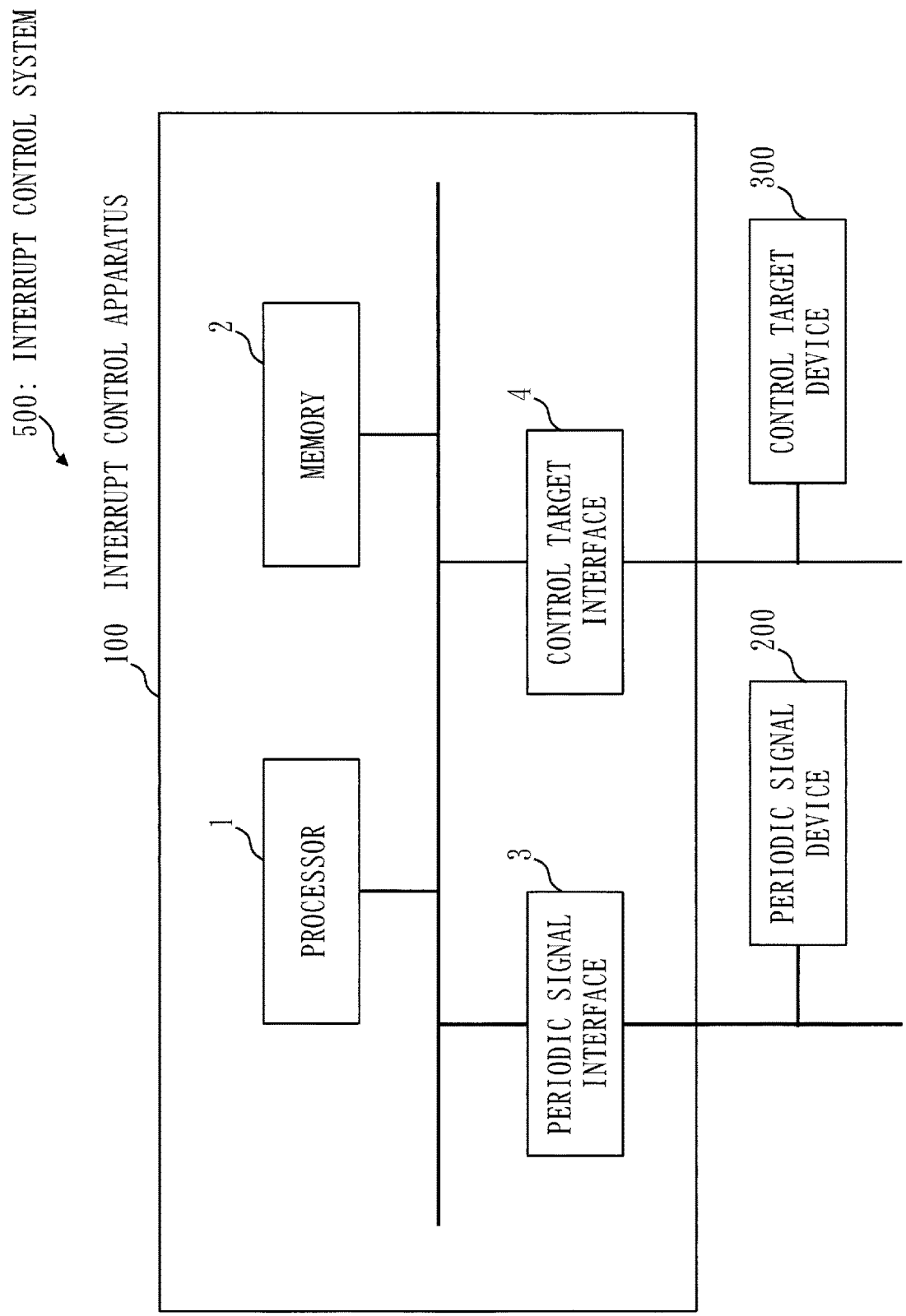
FIG. 1 is a hardware configuration diagram of an interrupt control system and an interrupt control apparatus according to a first embodiment.
Figure 2:
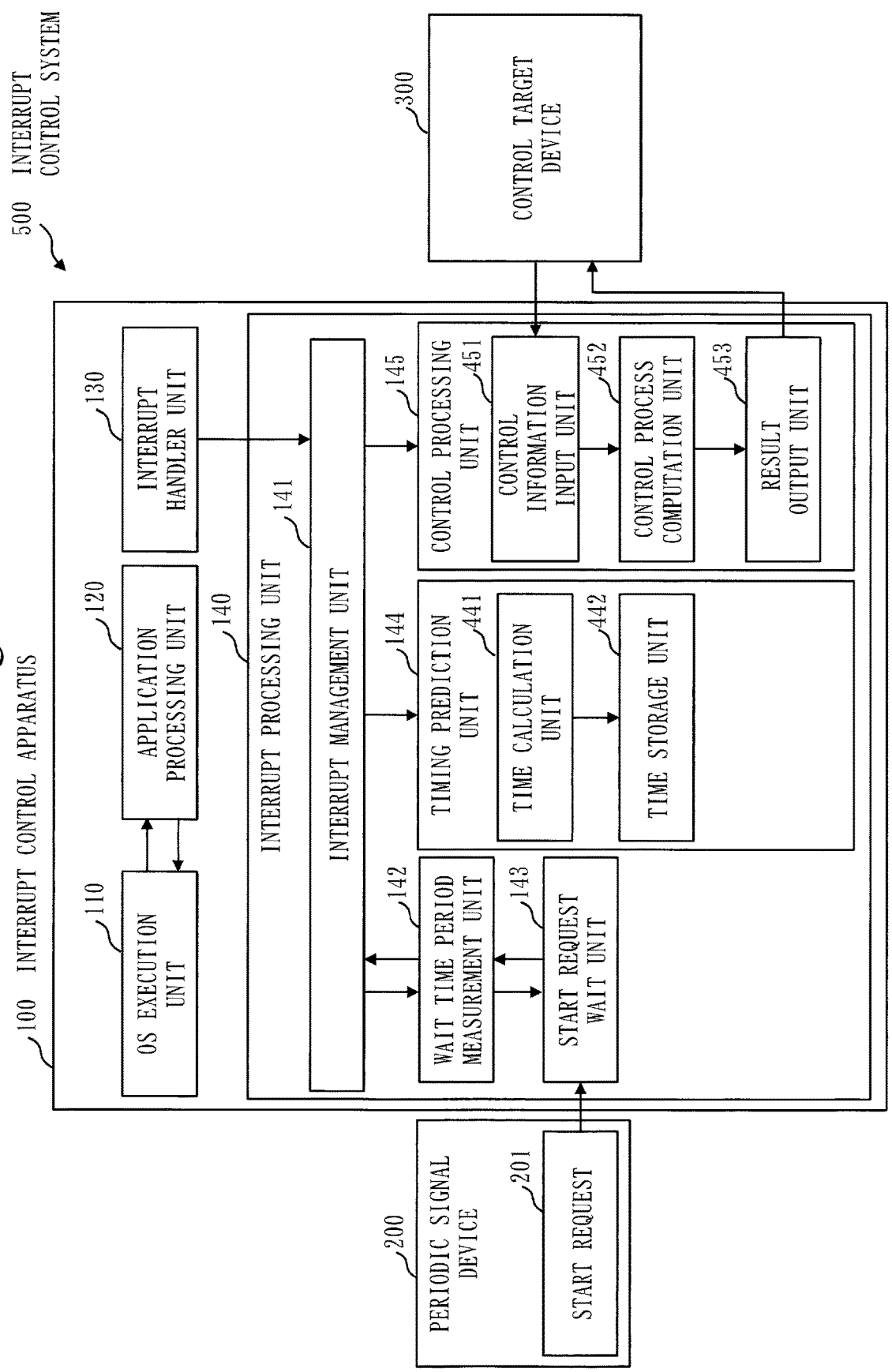
FIG. 2 is a functional configuration diagram of the interrupt control apparatus according to the first embodiment.

FIG. 1 is a hardware configuration diagram of an interrupt control system 500 and the interrupt control apparatus 100 according to this embodiment. FIG. 2 is a functional configuration diagram of the interrupt control apparatus 100 according to this embodiment.

Referring to FIGS. 1 and 2, configurations of the interrupt control system 500 and the interrupt control apparatus 100 according to this embodiment will be described.

The interrupt control system 500 includes the interrupt control apparatus 100, a periodic signal device 200, and a control target device 300. The interrupt control apparatus 100 obtains a periodic signal from the periodic signal device 200 as a start request 201, and uses the start request 201 as a trigger to perform the control process to control the control target device 300. The periodic signal device 200 periodically inputs the start request 201 to the interrupt control apparatus 100. The control target device 300 operates based on input and output of control information exchanged with the interrupt control apparatus 100.

The interrupt control apparatus 100 is a computer. The interrupt control apparatus 100 includes a processor 1 and also includes other hardware components such as a memory 2, a periodic signal interface 3, and a control target interface 4. The processor 1 is a single-core processor and is a device to perform the control process. The memory 2 is a device to store data necessary for the control process. The periodic signal interface 3 is a device to obtain a start request from the periodic signal device 200 located externally. The control target interface 4 is a device to perform input and output of control information exchanged with the control target device 300 located externally.

The hardware configuration of the interrupt control apparatus 100 will be described in detail below.

In addition to the above hardware components, the interrupt control apparatus 100 may include other hardware components such as an auxiliary storage device, an input interface, an output interface, and a communication device. The processor 1 is connected with other hardware components via signal lines and controls the other hardware components.

The interrupt control apparatus 100 includes, as functional elements, an OS execution unit 110, an application processing unit 120, an interrupt handler unit 130, and an interrupt processing unit 140. Functional elements of the interrupt processing unit 140 will be described in detail later.

The functions of the interrupt handler unit 130 and the interrupt processing unit 140 are realized mainly by software. Among the elements of the interrupt processing unit 140, a time storage unit 442 to be described later is provided in the memory 2. A control information input unit 451 and a result output unit 453 may be provided in the control target interface 4.

The processor 1 is a device to execute an interrupt control program. The interrupt control program is a program to realize the functions of the interrupt handler unit 130 and the interrupt processing unit 140.

The processor 1 is an integrated circuit (IC) that performs arithmetic processing. Specific examples of the processor 1 are a CPU, a digital signal processor (DSP), and a graphics processing unit (GPU).

The memory 2 is a storage device to temporarily store data. Specific examples of the memory 2 are a static random access memory (SRAM) and a dynamic random access memory (DRAM).

The auxiliary storage device is a storage device to store data. A specific example of the auxiliary storage device is an HDD. Alternatively, the auxiliary storage device may be a portable storage medium such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface is a port to be connected with an input device such as a mouse, a keyboard, or a touch panel. Specifically, the input interface is a Universal Serial Bus (USB) terminal. The input interface may be a port to be connected with a local area network (LAN).

The output interface is a port to which a cable of an output device such as a display is to be connected. Specifically, the output interface is a USB terminal or a High Definition Multimedia Interface (HDMI, registered trademark) terminal. Specifically, the display is a liquid crystal display (LCD).

The communication device has a receiver and a transmitter. The communication device is connected to a communication network such as a LAN, the Internet, or a telephone line. Specifically, the communication device is a communication chip or a network interface card (NIC).

The interrupt control program is read by the processor 1 and executed by the processor 1. The memory stores not only the interrupt control program but also an operating system (OS). The processor 1 executes the interrupt control program while executing the OS. The interrupt control program and the OS may be stored in the auxiliary storage device. The interrupt control program and the OS stored in the auxiliary storage device are loaded into the memory 2 and executed by the processor 1. Part or the entirety of the interrupt control program may be embedded in the OS.

The interrupt control apparatus 100 may include a plurality of processors as an alternative to the processor 1. The plurality of processors share the execution of the interrupt control program. Each of the processors is, like the processor 1, a device to execute the interrupt control program.

Data, information, signal values, and variable values that are used, processed, or output by the interrupt control program are stored in the memory 2 or the auxiliary storage device, or stored in a register or a cache memory in the processor 1.

"Unit" of each unit of the interrupt control apparatus 100 may be interpreted as "process", "procedure", or "step". Each unit of the interrupt control apparatus 100 refers to the interrupt handler unit 130 and, in addition, an interrupt management unit 141, a wait time period measurement unit 142, a start request wait unit 143, a time calculation unit 441 of a timing prediction unit 144, and a control process computation unit 452 of a control processing unit 145, which are to be described later. That is, each unit of the interrupt control apparatus 100 refers to the interrupt handler unit 130, the interrupt management unit 141, the wait time period measurement unit 142, the start request wait unit 143, the time calculation unit 441, and the control process computation unit 452.

"Process" in each of the interrupt handler process, the interrupt management process, the wait time period measurement process, the start request wait process, the timing prediction process, the control process, the time calculation process, and the control process computation process may be interpreted as "program", "program product", or "computer readable storage medium recording a program".

The interrupt control program causes a computer to execute each process, each procedure, or each step, where "unit" of each of the above units is interpreted as "process", "procedure", or "step". An interrupt control method is a method implemented by execution of the interrupt control program by the interrupt control apparatus 100.

The interrupt control program may be stored and provided in a computer readable recording medium. Alternatively, the interrupt control program may be provided as a program product.

*Overview Description of Functions*

The interrupt control apparatus 100 includes the OS execution unit 110, the application processing unit 120, the interrupt handler unit 130, and the interrupt processing unit 140.

The interrupt handler unit 130 generates a timer interrupt at an interrupt time, and executes an interrupt preparation process. Specifically, the interrupt handler unit 130 generates the timer interrupt at the interrupt time stored in the time storage unit 442. The interrupt handler unit 130 generates the timer interrupt to interrupt execution of an application performed by the application processing unit 120, executes the interrupt preparation process, and causes the functions of the interrupt management unit 141 of the interrupt processing unit 140 to be executed.

The interrupt processing unit 140 includes the interrupt management unit 141, the wait time period measurement unit 142, the start request wait unit 143, the timing prediction unit 144, and the control processing unit 145. The interrupt management unit 141 invokes the functions of the wait time period measurement unit 142, the timing prediction unit 144, and the control processing unit 145.

The wait time period measurement unit 142 measures a time period from completion of the interrupt preparation process to generation of the start request 201 as the wait time period. Specifically, upon completion of the interrupt preparation process, the wait time period measurement unit 142 obtains the current time as a start time, and treats the time when the start request 201 is generated as an end time. Then, the wait time period measurement unit 142 measures the time period from the start time to the end time as the wait time period.

The start request wait unit 143 waits for a periodic signal, which is the start request 201, and notifies the wait time period measurement unit 142 of generation of the start request 201.

The timing prediction unit 144 includes the time calculation unit 441 and the time storage unit 442.

The time calculation unit 441 calculates a subtraction time period based on the wait time period measured by the wait time period measurement unit 142, and calculates a preparation time period that is the sum of a time period obtained by subtracting the subtraction time period from the wait time period and a processing time period of the interrupt preparation process. Then, the time calculation unit 441 stores a time that is earlier than the time of a next start request 201 only by the preparation time period, that is, the time obtained by shifting back the preparation time period from the time of the next start request, as a next interrupt time in the time storage unit 442. The time calculation unit 441 calculates a time period obtained by multiplying the wait time period by a threshold value representing a ratio, as the subtraction time period. The threshold value is stored in the memory 2. Specifically, the threshold value is predetermined, such as one-half, one-third, or three-fifth.

The time storage unit 442 stores the interrupt time at which the interrupt preparation process for preparing for the interrupt process is to be started. The time storage unit 442 sets a timing at which the interrupt handler unit 130 is to generate a next timer interrupt as the interrupt time.

The control processing unit 145 includes the control information input unit 451, the control process computation unit 452, and the result output unit 453. The control information input unit 451 obtains control target information from the control target device 300. The control process computation unit 452 performs computation based on the control target information. The result output unit 453 outputs a result of the computation to the control target device 300.

*Description of Operation*

Figure 3:
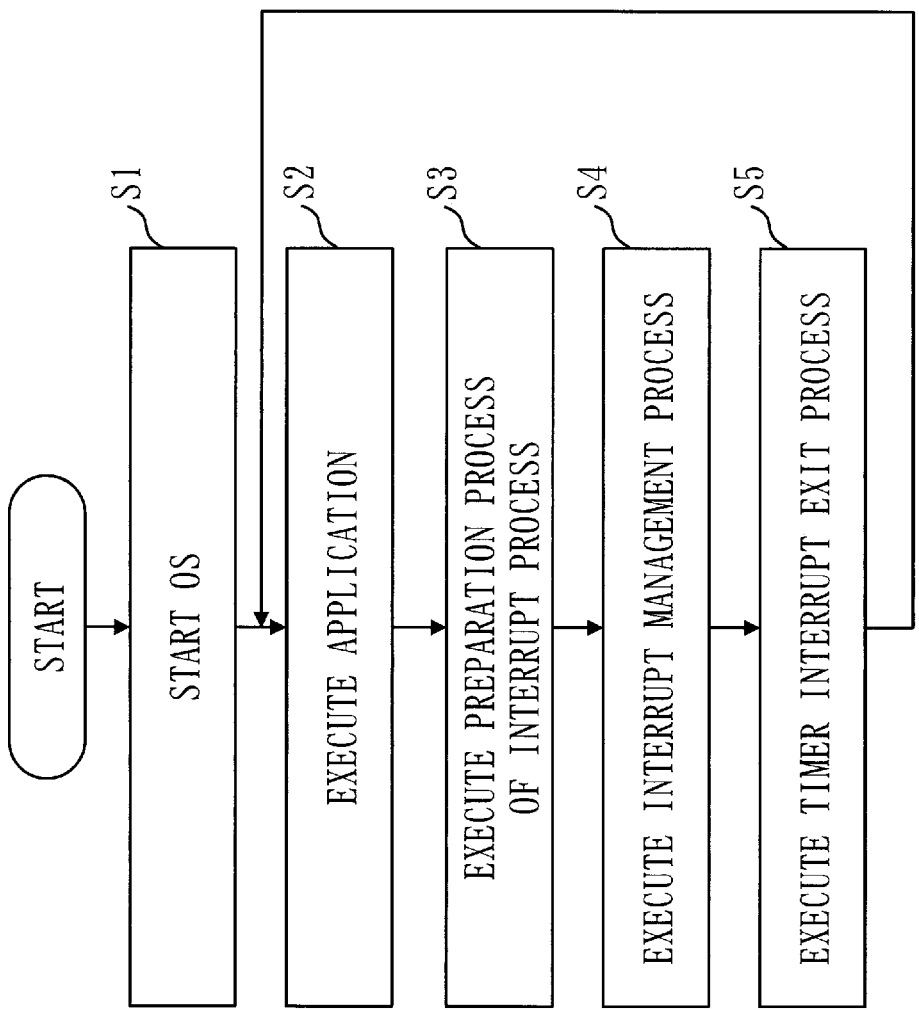
FIG. 3 is a flowchart illustrating operation of the interrupt control apparatus according to the first embodiment.

FIG. 3 is a flowchart illustrating operation of the interrupt control apparatus 100 according to this embodiment.

In step S1, the OS is started by the OS execution unit 110.

In step S2, an application program is executed by the application processing unit 120.

In step S3, the interrupt handler unit 130 generates a timer interrupt at the interrupt time set in the time storage unit 442, and executes the interrupt preparation process.

In step S4, the interrupt processing unit 140 executes an interrupt management process.

In step S5, the interrupt handler unit 130 executes an interrupt handler exit process.

Then, the operation returns to the execution of the application program by the application processing unit 120, that is, step S2.

Figure 4:
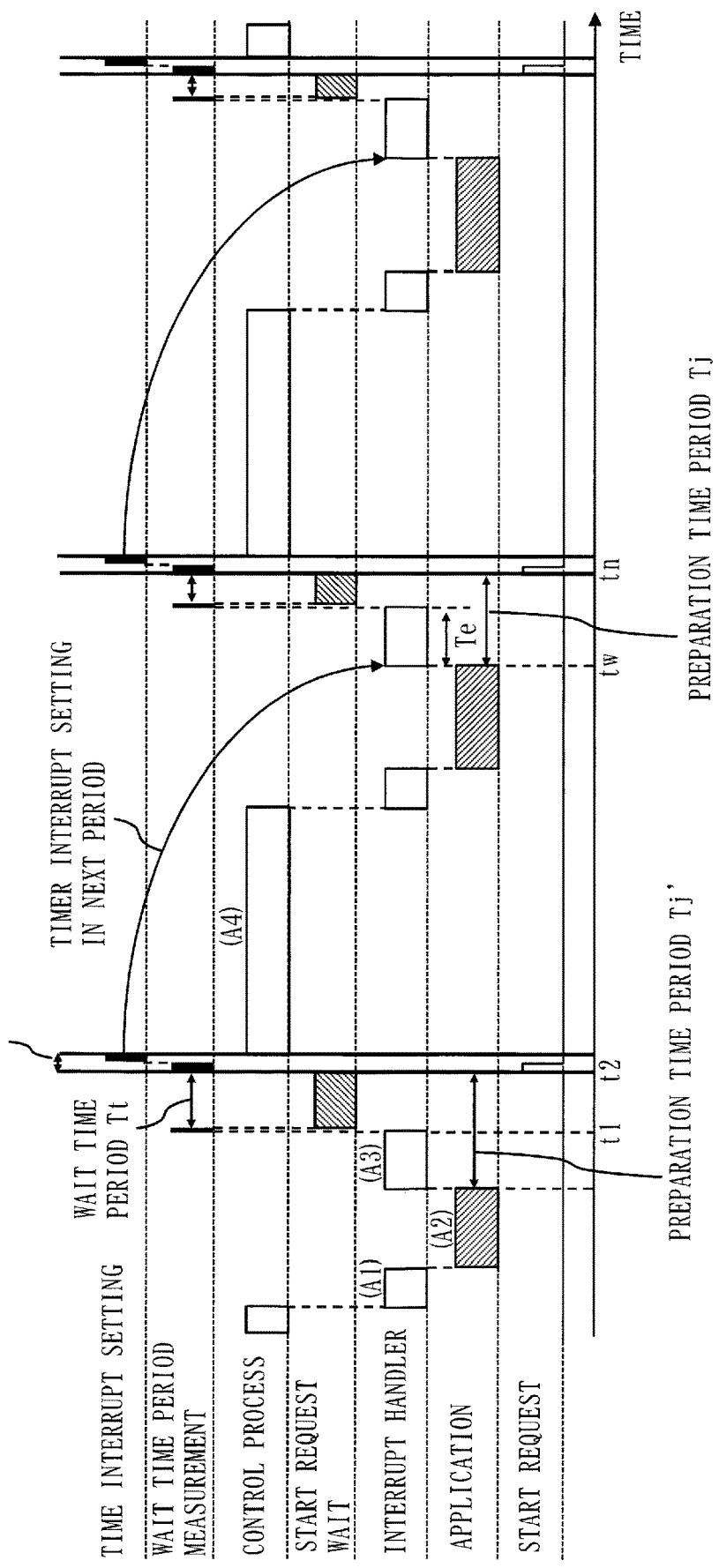
FIG. 4 is a timing diagram based on an interrupt management process according to the first embodiment.

FIG. 4 is a timing diagram of the interrupt process according to this embodiment. In FIG. 4, upon completion of the interrupt handler exit process of (A1), the application process of (A2) is executed. A state in which the interrupt preparation process of (A3) is then executed is indicated.

Figure 5:
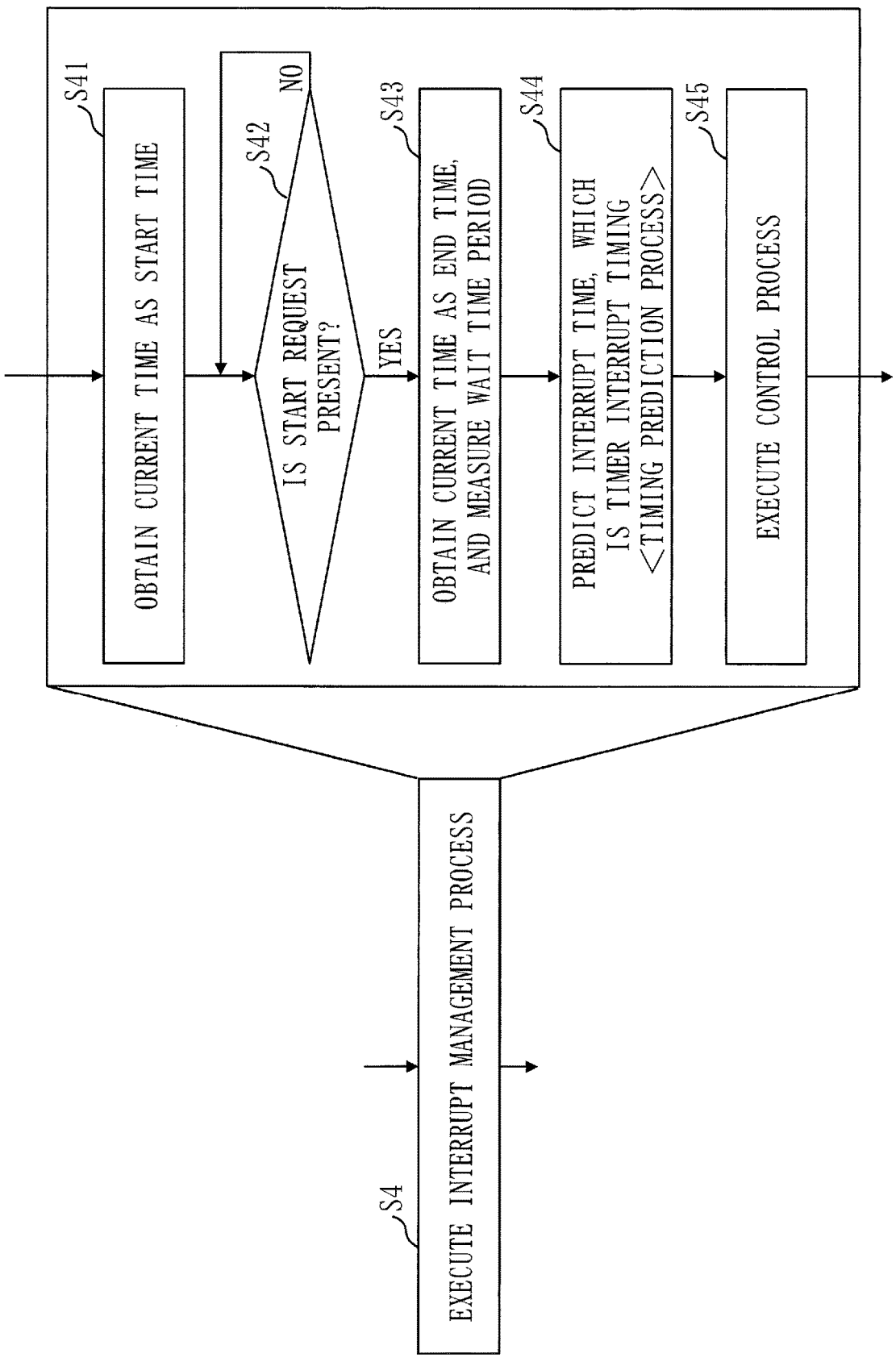
FIG. 5 is a detailed flowchart of the interrupt management process according to the first embodiment.

FIG. 5 is a detailed flowchart of the interrupt management process of step S4 according to this embodiment.

In the interrupt management process, each functional component unit to be executed as the interrupt management process is invoked from the interrupt management unit 141.

In step S41, the wait time period measurement unit 142 obtains the current time as the start time. In an example in FIG. 4, a start time t1 is obtained.

In step S42, the start request wait unit 143 executes a wait process to check whether the start request 201 from the periodic signal device 200 is present. If the start request 201 is present, the process proceeds to step S43. If the start request 201 is not present, step S42 is repeated until the start request 201 is present.

In step S43, the wait time period measurement unit 142 obtains the current time as the end time. In the example in FIG. 4, an end time t2 is obtained. The wait time period measurement unit 142 calculates a wait time period Tt based on a difference between the start time t1 and the end time t2.

In step S44, the timing prediction unit 144 executes a timing prediction process to predict an interrupt time tw, which is the timing of a timer interrupt.

In step S45, the control processing unit 145 executes the control process of (A4), which is the interrupt process.

Figure 6:
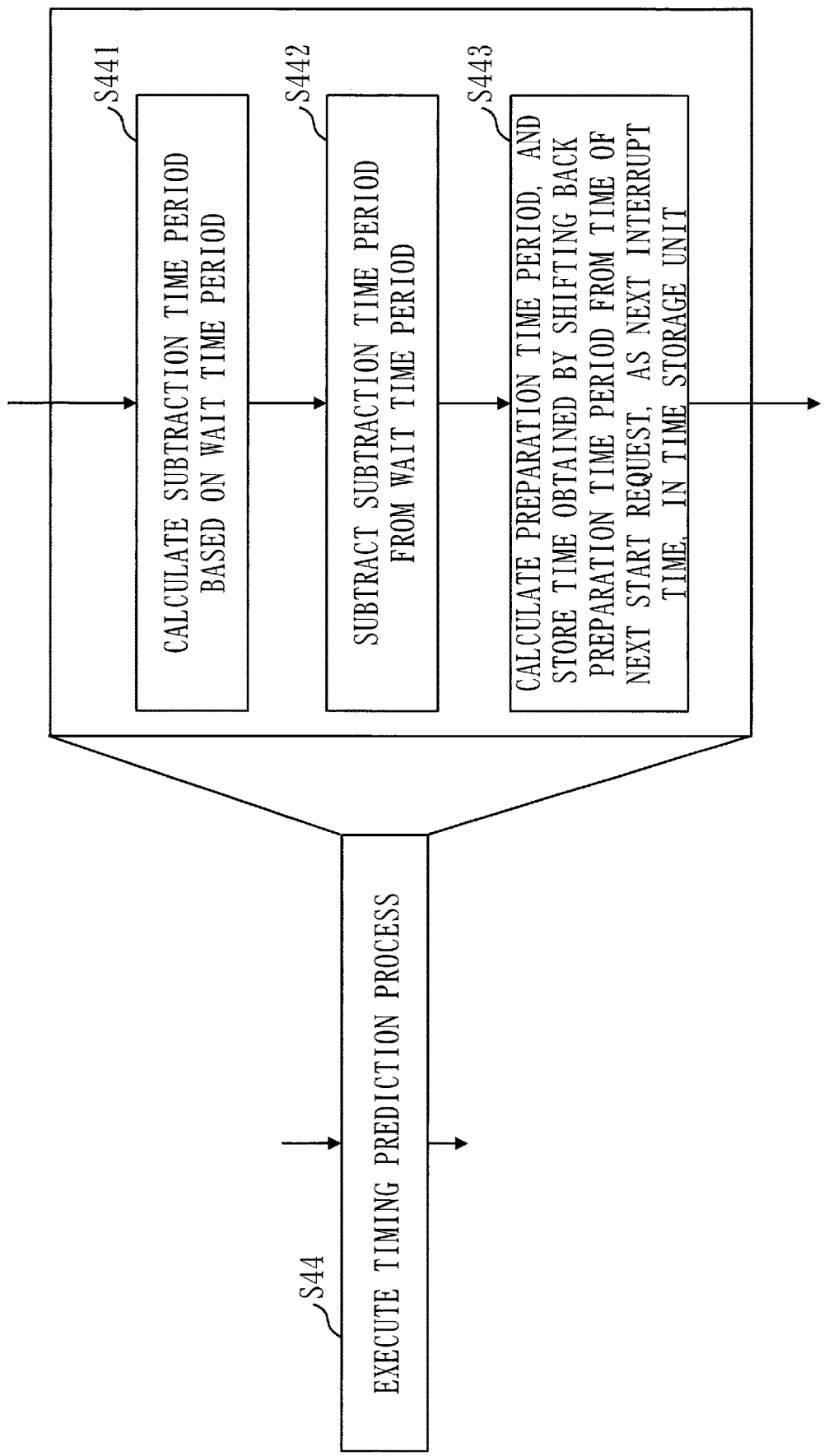
FIG. 6 is a detailed flowchart of a timing prediction process according to the first embodiment.

FIG. 6 is a detailed flowchart of the timing prediction process of step S44 according to this embodiment.

In step S441, the time calculation unit 441 calculates a subtraction time period Ts based on the wait time period Tt measured by the wait time period measurement unit 142. Specifically, the time calculation unit 441 calculates a time period obtained by multiplying the wait time period Tt by a threshold value representing a ratio, as the subtraction time period Ts. For example, the time calculation unit 441 calculates a time period obtained by multiplying the wait time period Tt by one-half, that is, half the time period of the wait time period Tt, as the subtraction time period Ts. Note that the time calculation unit 441 may obtain only the start time t1 and the end time t2 from the wait time period measurement unit 142, and the time calculation unit 441 may calculate the wait time period Tt based on a difference between the start time t1 and the end time t2.

In step S442, the time calculation unit 441 calculates a preparation time period Tj that is the sum of a time period obtained by subtracting the subtraction time period Ts from the wait time period Tt and a processing time period Te of the interrupt preparation process. Note that a processing time period for obtaining the start time t1 may be pre-included in the preparation time period Tj.

In step S443, the time calculation unit 441 sets a time tw that is earlier than a time tn of the next start request by the preparation time period Tj as the next interrupt time. In other words, the time calculation unit 441 sets the time obtained by shifting back the preparation time period Tj from the time tn of the next start request as the next interrupt time tw. The time calculation unit 441 stores the interrupt time tw as the interrupt timing of the next timer interrupt in the time storage unit 442.

Figure 7:
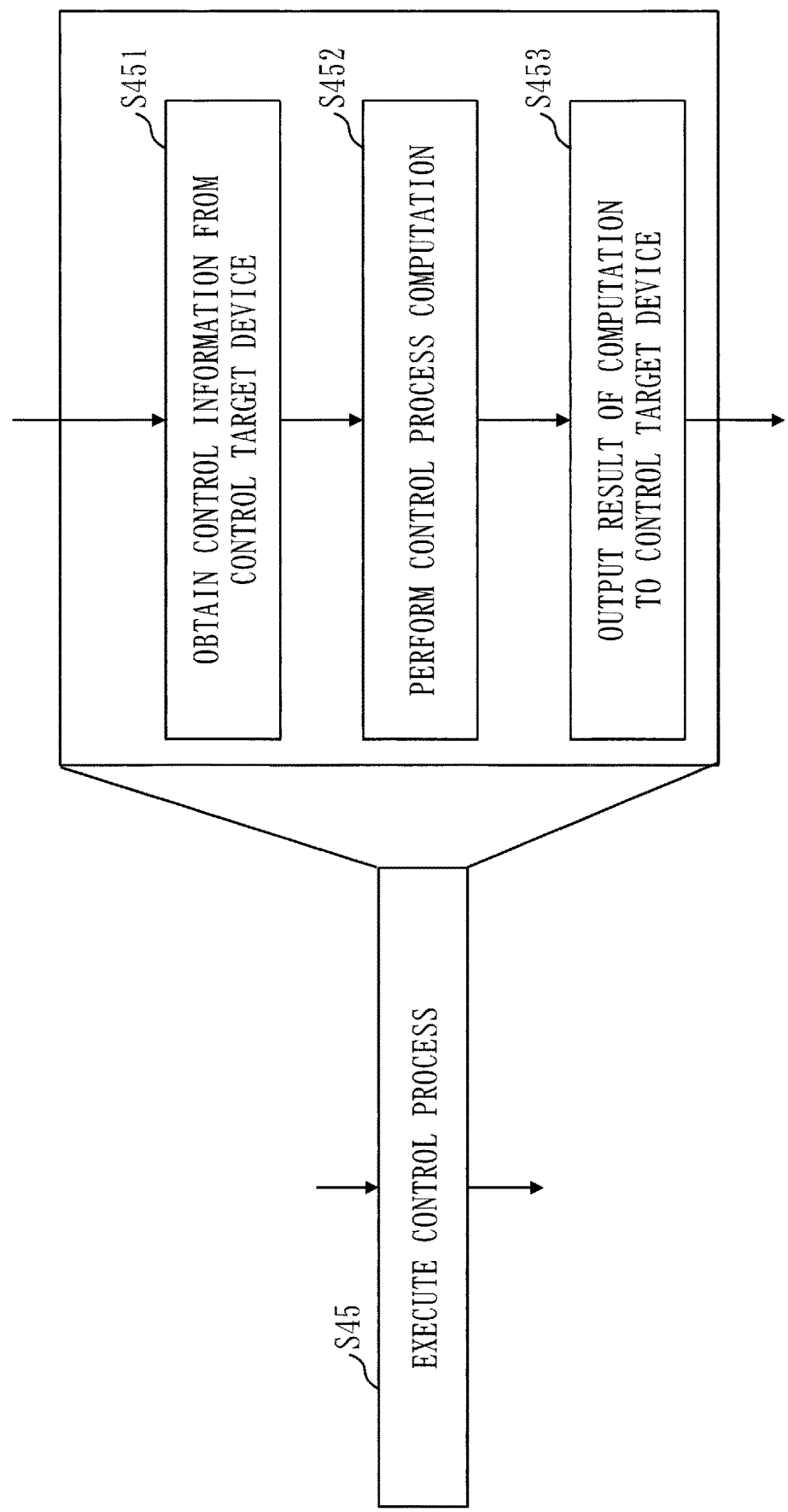
FIG. 7 is a detailed flowchart of a control process according to the first embodiment.

FIG. 7 is a detailed flowchart of the control process of step S45 according to this embodiment.

In step S451, the control information input unit 451 obtains control information from the control target device 300.

In step S452, the control process computation unit 452 executes computation of the control process, using the control information.

In step S453, the result output unit 453 outputs a result of the computation to the control target device 300.

Description of Effects of this Embodiment

Figure 8:
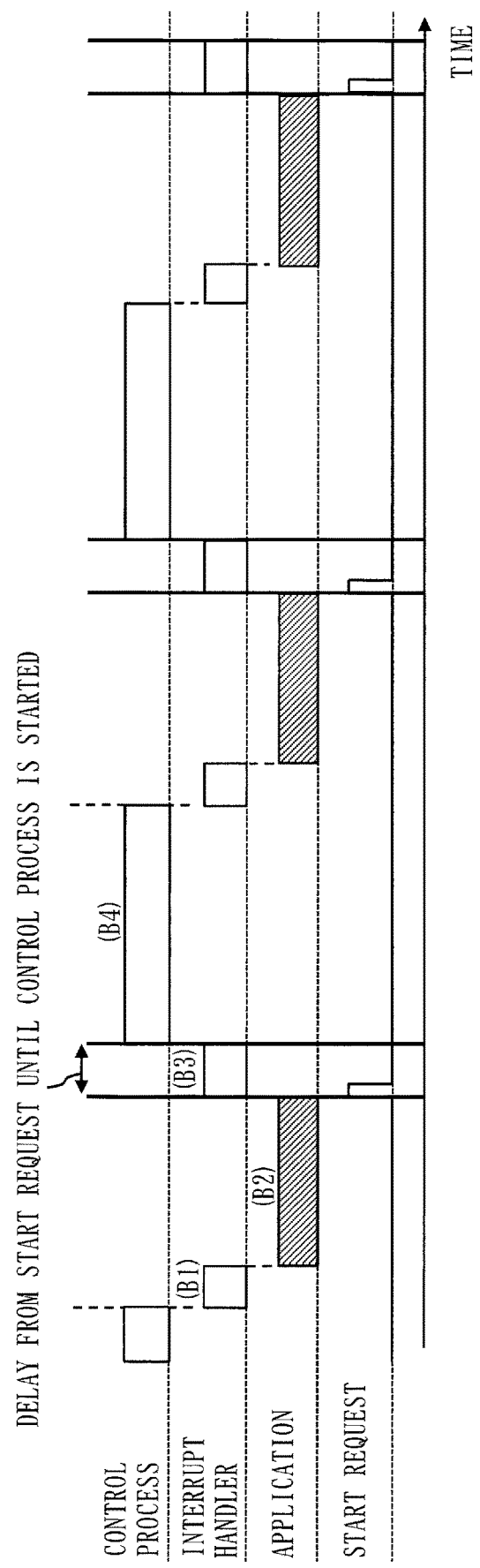
FIG. 8 is an example of a timing diagram to be compared with the interrupt management process according to the first embodiment.

FIG. 8 is an example of a timing diagram to be compared with the interrupt process according to this embodiment. FIG. 8 indicates a timing diagram of a case in which the control process is started by generating a timer interrupt concurrently with a start request. In FIG. 8, upon completion of the interrupt handler exit process of (B1), the application process of (B2) is executed. Then, the interrupt preparation process of (B3) is executed and the control process of (B4) is started. Therefore, in the timing diagram of FIG. 8, a delay occurs in the start timing of the control process, depending on the processing time period of the interrupt preparation process.

Figure 9:
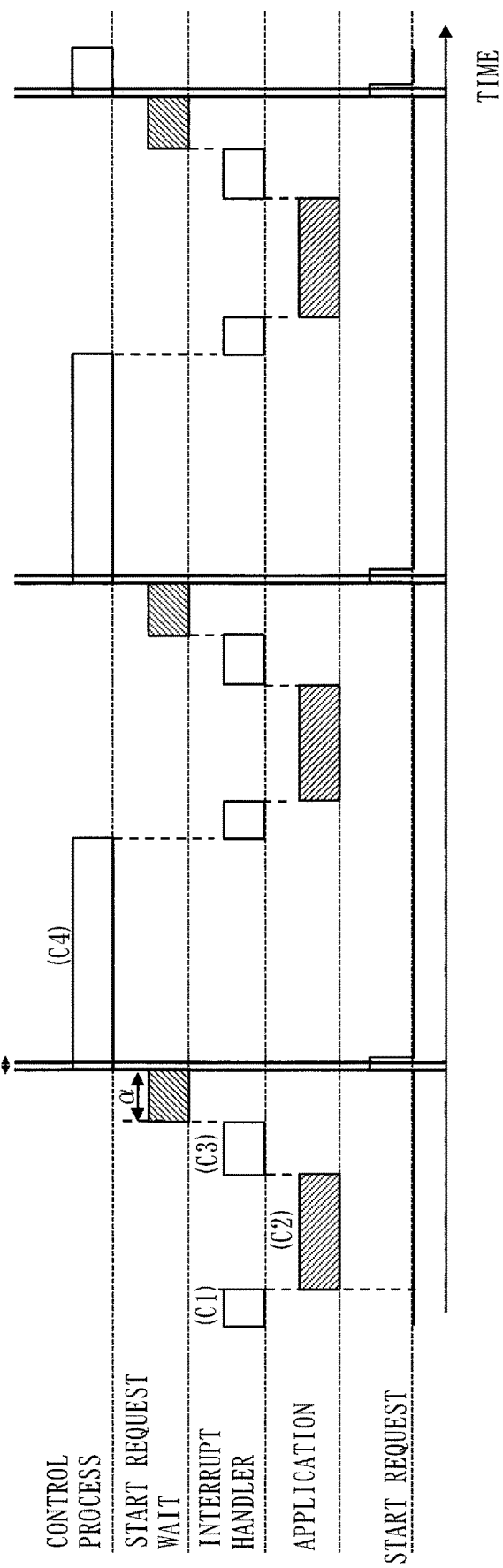
FIG. 9 is another example of a timing diagram to be compared with the interrupt management process according to the first embodiment.

FIG. 9 is another example of a timing diagram to be compared with the interrupt process according to this embodiment. FIG. 9 indicates a method in which the timing of a timer interrupt is predicted and the timer interrupt is generated at a time earlier than a start request. In FIG. 9, (C1) is the interrupt handler exit process and (C2) is the application process. In the method of FIG. 9, the processing time period of the interrupt preparation process is measured in advance. Then, the timer interrupt is generated at a time that is earlier than a start request by a time period that is the sum of the measured time period and a wait time period a. That is, in the method of FIG. 9, the timer interrupt is generated at the time that is earlier than the start request only by the time period that is the sum of the execution time period of the interrupt preparation process of (C3) and the wait time period a. In FIG. 9, when the timer interrupt is generated, the interrupt preparation process of (C3) is executed, and after waiting for the wait time period a, the control process of (C4) is executed. However, a period of a certain length needs to be secured as the wait time period a in order to accommodate a change in the processing time period of the interrupt preparation process.

FIG. 4 is a timing diagram based on the interrupt process according to this embodiment. In the interrupt process according to this embodiment, the preparation time period Tj for setting the interrupt time in the next period is a time period obtained by subtracting half the value of the wait time period Tt from a previous preparation time period Tj'. Therefore, the wait time period Tt will be halved in each period, so that the preparation time period Tj can also be shortened in each period.

As described above, in this embodiment, the wait time period measurement unit and the timing prediction unit are provided, so that even when the execution time period of the interrupt preparation process changes, there is no need to re-measure it. Furthermore, in the comparison example in FIG. 9, the interrupt time of a timer interrupt needs to be set by adding the wait time period a to the processing time period of the interrupt preparation process. However, in this embodiment, the interrupt time of a timer interrupt can be set such that a wait state is entered immediately before a start request.

In the interrupt control apparatus according to this embodiment, the timing to start the preparation process can be set such that the preparation process is completed immediately before a start request with a minimum margin, without being affected by a difference between the execution time period in an environment in which measurement is performed in advance and the execution time period in an environment in which the control process is executed.

*Other Configurations*

<First Variation>

In this embodiment, a start request is input to the interrupt control apparatus from the periodic signal device external to the interrupt control apparatus 100. However, there may be an arrangement to periodically issue a start request within the interrupt control apparatus, instead of inputting a start request from the outside of the interrupt control apparatus.

<Second Variation>

In this embodiment, the interrupt preparation process is described as the preparation process. Substantially the same effects can be obtained in other cases such as a case in which a required preparation process is loading data from a memory.

<Third Variation>

In the timing prediction process of this embodiment, processing to halve the wait time period in each period is performed. However, processing other than halving may be performed, provided that the wait time period decreases in each period.

Alternatively, the measured wait time period may be directly subtracted from the previous interrupt timing. For example, by setting the threshold value to 0, the subtraction time period can be set to 0 and the wait time period can be directly subtracted from the interrupt timing. With this variation, it can be expected that there will be no wait time period in the next period. Alternatively, a plurality of previous wait time periods may be stored so that they can be referred to, and the interrupt timing in the next period may be calculated based on the plurality of pervious wait time periods. Alternatively, an allowable time period for the wait time period may be determined in advance, and if the wait time period is within the allowable wait time period, the set value of the timer interrupt may be the same value as that of the previous interrupt timing. This makes it possible to keep the wait time period within the allowable time period and also to reduce the probability that a start request has already been issued when measurement of the wait time period is started.

<Fourth Variation>

In this embodiment, the units of the interrupt control apparatus 100 are realized by software. As a variation, the functions of the units of the interrupt control apparatus 100 may be realized by hardware. In this case, the interrupt control apparatus 100 includes an electronic circuit in place of the processor 1.

The electronic circuit is a dedicated electronic circuit that realizes the functions of the units of the interrupt control apparatus 100.

Specifically, the electronic circuit is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the units of the interrupt control apparatus 100 may be realized by one electronic circuit, or may be distributed among and realized by a plurality of electronic circuits.

As another variation, some of the functions of the units of the interrupt control apparatus 100 may be realized by the electronic circuit, and the rest of the functions may be realized by software.

Each of the processor and the electronic circuit is also referred to as processing circuitry. That is, in the interrupt control apparatus 100, the functions of the units of the interrupt control apparatus 100 are realized by the processing circuitry.

Second Embodiment

In this embodiment, differences from the first embodiment will be mainly described. The components that are substantially the same as those in the first embodiment are denoted by the same reference signs and description thereof may be omitted.

In the first embodiment, the interrupt timing is set such that the wait time period in the next period decreases from the measured wait time period. In this case, there may be a case in which a start request has already been issued when measurement of the wait time period is started. The case in which a start request has already been issued when measurement of the wait time period is started is referred to as a violation. In this embodiment, an interrupt control apparatus 100a is provided with an arrangement to prevent a violation from occurring in the next period.

*Description of Operation*

Figure 10:
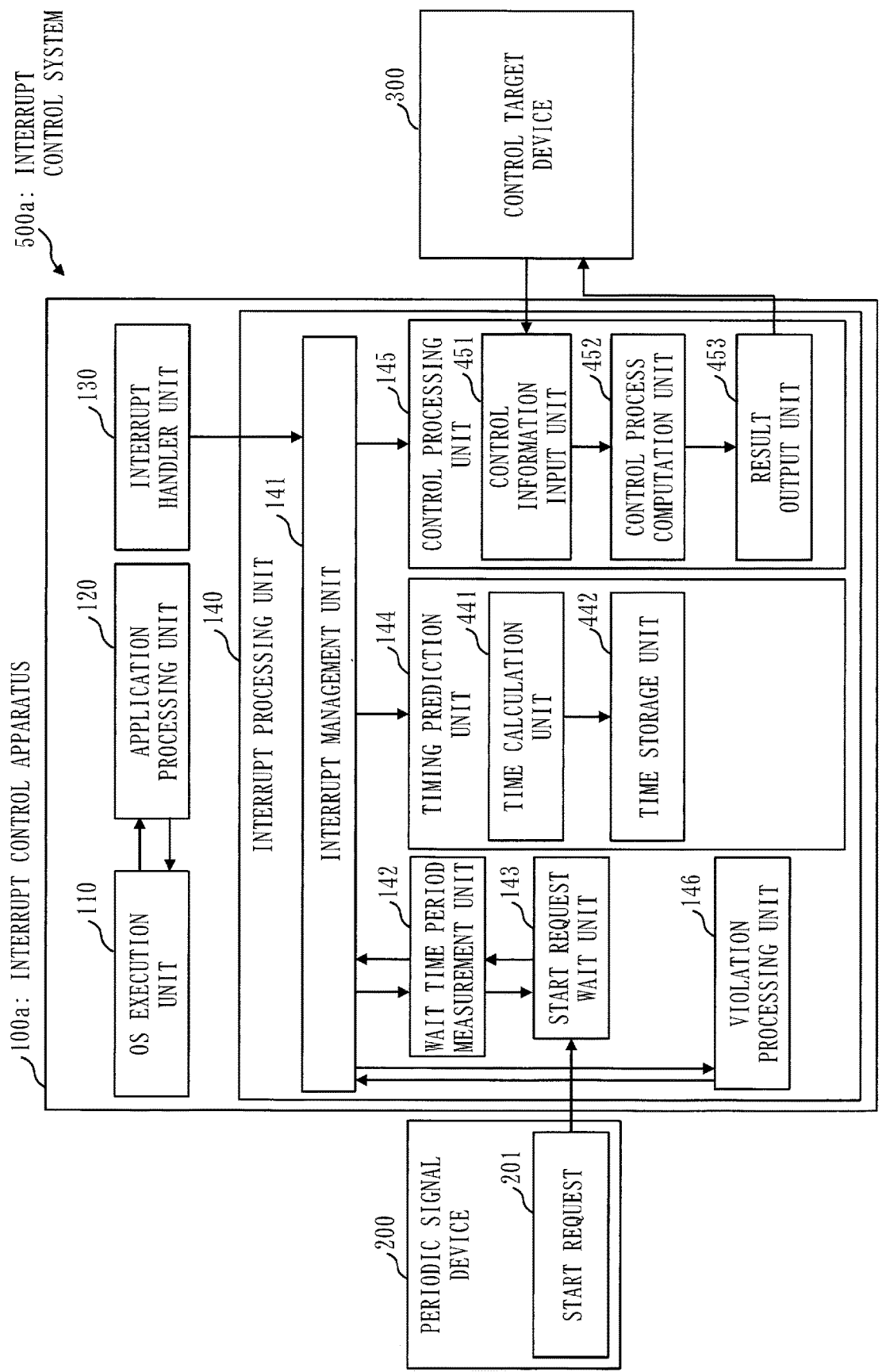
FIG. 10 is a functional configuration diagram of an interrupt control apparatus according to a second embodiment.

Referring to FIG. 10, a functional configuration of the interrupt control apparatus 100a according to a second embodiment will be described.

The interrupt control apparatus 100a according to this embodiment includes a violation processing unit 146 in addition to the functional components of the interrupt control apparatus 100 of the first embodiment. The violation processing unit 146 has a function of detecting a violation and a function of calculating an interrupt time in case of a violation. The violation processing unit 146 determines whether a start request has been generated after completion of the interrupt preparation process and before acquirement of the start time. If a start request has been generated, the violation processing unit 146 increases the next preparation time period to be longer than the previous preparation time period. The violation processing unit 146 sets the next interrupt time, using the next preparation time period that has been increased.

Figure 11:
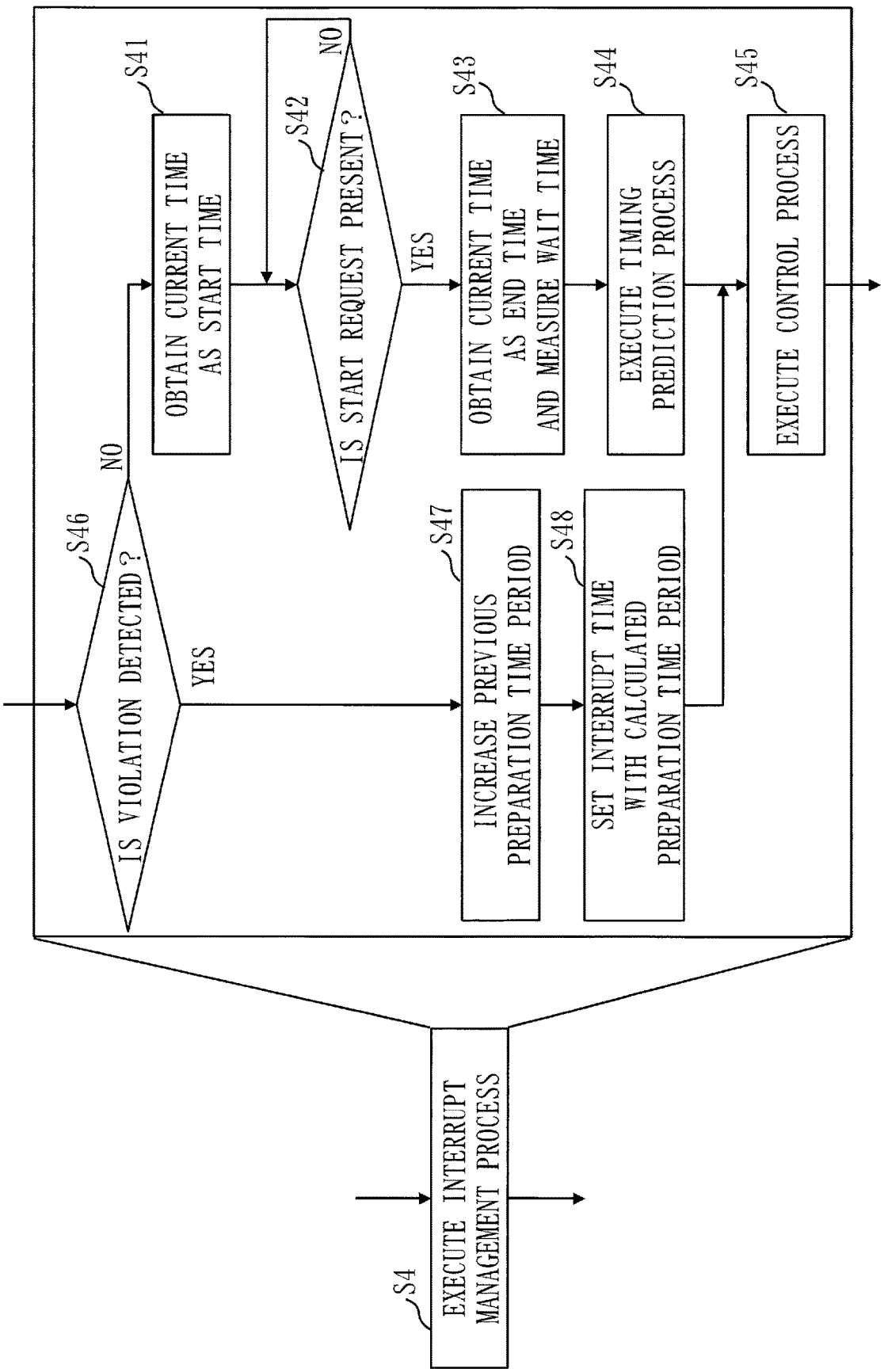
FIG. 11 is a detailed flowchart of an interrupt management process according to the second embodiment.

FIG. 11 is a detailed flowchart of the interrupt management process according to this embodiment.

In step S46, the violation processing unit 146 determines whether a violation has been detected. The violation processing unit 146 detects whether a violation has occurred by checking whether a start request has been generated immediately after the timer interrupt. If no violation is detected, the process proceeds to step S41. The process from steps S41 to S45 is substantially the same as the process from steps S41 to S45 in FIG. 5.

If a violation is detected, the process proceeds to step S47.

In steps S47 and S48, the violation processing unit 146 increases the preparation time period Tj used for setting the previous interrupt time tw, and sets the next interrupt time, using the increased preparation time period. Then, the violation processing unit 146 stores the next interrupt time in the time storage unit 442.

Description of Effects of this Embodiment

In the interrupt control apparatus according to this embodiment, when the violation processing unit detects a violation, the previous preparation time period is increased and the timer interrupt is set with the increased preparation time period. Therefore, recovery from the violation can be attempted in the next period. In addition, the interrupt timing can be calculated such that if a violation occurs once, recovery from the violation is achieved without recurrence of the violation in subsequent periods.

Third Embodiment

In this embodiment, differences from the first embodiment will be mainly described. The components that are substantially the same as those in the first embodiment are denoted by the same reference signs and description thereof may be omitted.

The first embodiment has been described assuming that the processor 1 is a single-core processor. In this embodiment, an interrupt control system 500b and an interrupt control apparatus 100b will be described, in which a multi-core processor 5 is a multi-core processor including a core-0 and a core-1, and the core-0 and the core-1 process the control process in parallel. In the core-0, a periodic interrupt to start the control process is generated periodically, and immediately after that, the start request 201 for the control process is issued from the core-0 to the core-1 to start parallel processing.

*Description of Configurations*

Figure 12:
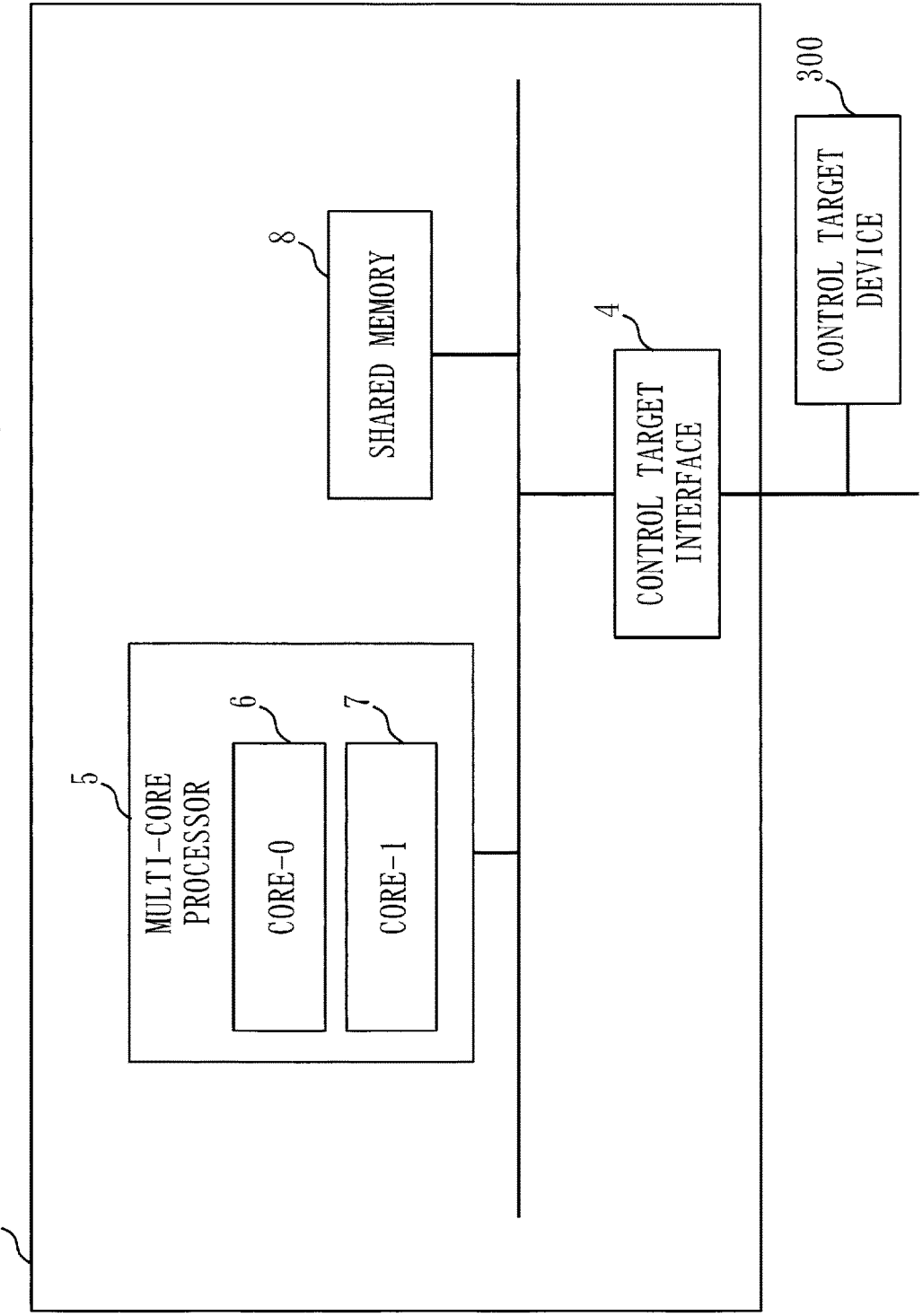
FIG. 12 is a hardware configuration diagram of an interrupt control system and an interrupt control apparatus according to a third embodiment.

Referring to FIG. 12, hardware configurations of the interrupt control system 500b and the interrupt control apparatus 100b according to this embodiment will be described.

The interrupt control apparatus 100b includes the multi-core processor 5, a shared memory 8, and the control target interface 4. The multi-core processor 5 is equipped with a core-0 6, which is a device to execute the control process, and a core-1 7 to predict an interrupt timing. The shared memory 8 is a device for sharing data necessary for the control process between the two cores.

Figure 13:
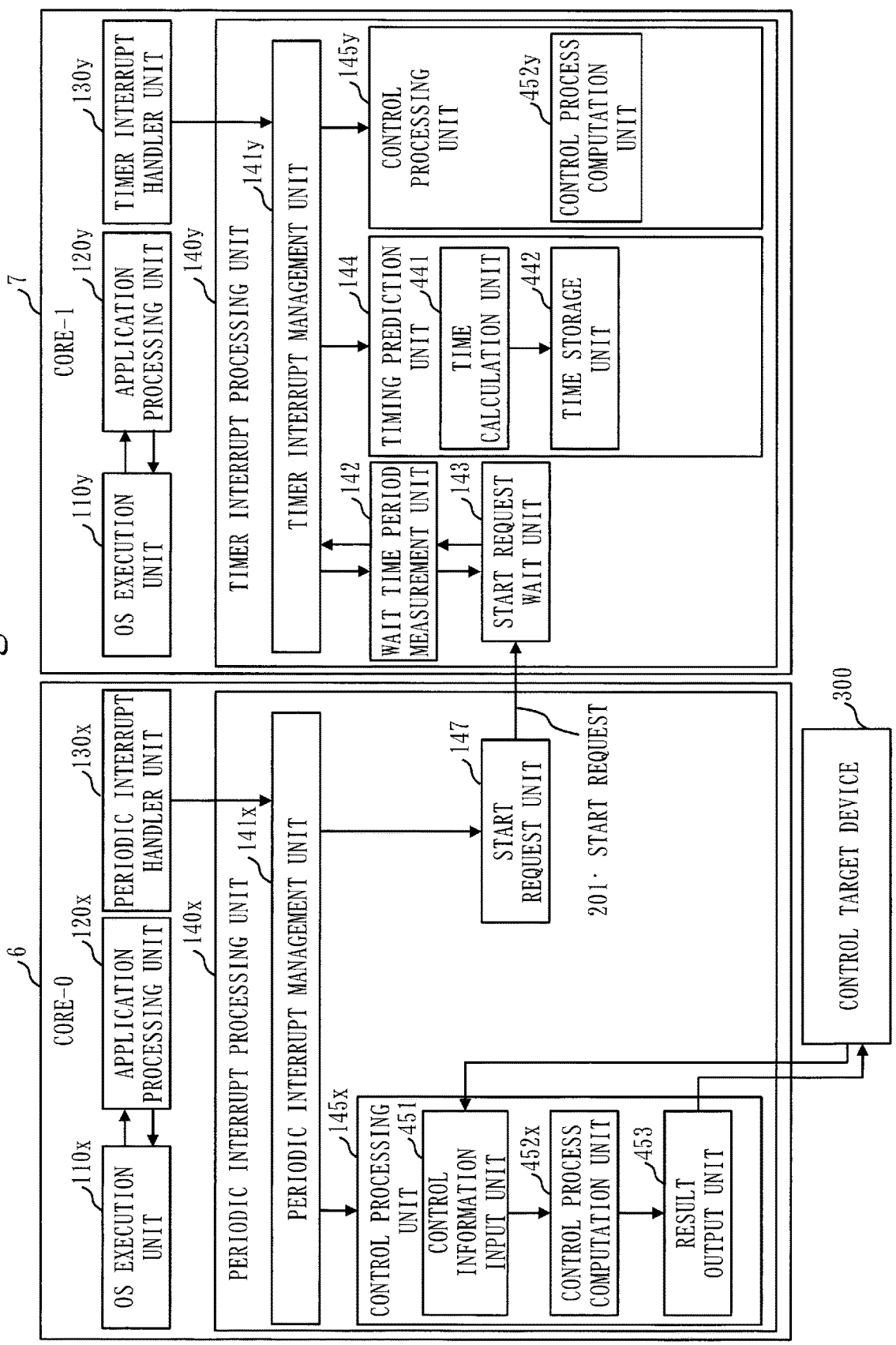
FIG. 13 is a functional configuration diagram of the interrupt control apparatus according to the third embodiment.

Referring to FIG. 13, a functional configuration of the interrupt control apparatus 100b according to this embodiment will be described.

The interrupt control apparatus 100b is composed of the core-0 6 and the core-1 7.

The core-0 includes an OS execution unit 110x, an application processing unit 120x, a periodic interrupt handler unit 130x, and a periodic interrupt processing unit 140x. The periodic interrupt handler unit 130x generates a periodic interrupt at a start timing of the control process and invokes a periodic interrupt management unit 141x. The control process is executed periodically by the periodic interrupt. The periodic interrupt processing unit 140x includes the periodic interrupt management unit 141x, a control processing unit 145x, and a start request unit 147. The periodic interrupt management unit 141x invokes the start request unit 147 and the control processing unit 145x. The start request unit 147 notifies the core-1 of a start request for the control process. The control processing unit 145x includes the control information input unit 451, a control process computation unit 452x, and the result output unit 453. The control process computation unit 452x executes the control process assigned to the core-0, and executes the control process while sharing data with a control process computation unit 452y of the core-1.

The core-1 includes an OS execution unit 110y, an application processing unit 120y, a timer interrupt handler unit 130y, and a timer interrupt processing unit 140y. The control process computation unit 452y of a control processing unit 145y in the timer interrupt processing unit 140y executes the control process assigned to the core-1, and executes the control process while sharing data with the control process computation unit 452x of the core-0.

*Description of Operation*

Figure 14:
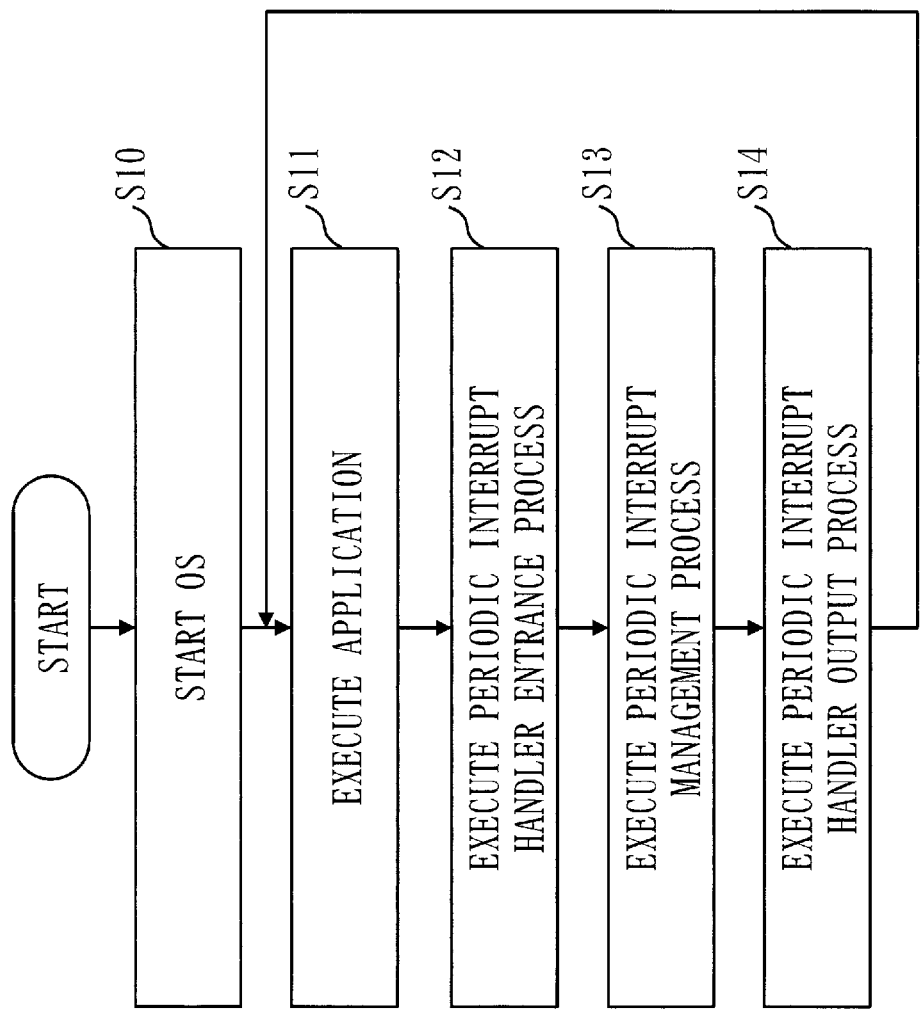
FIG. 14 is a flowchart illustrating operation of a core-0 of the interrupt control apparatus according to the third embodiment.

FIG. 14 is a flowchart illustrating operation of the core-0 of the interrupt control apparatus 100b according to this embodiment.

Steps S10 and S11 are substantially the same as steps S1 and S2 in FIG. 3.

In step S12, the periodic interrupt handler unit 130x generates a periodic interrupt, and the periodic interrupt handler unit 130x executes a periodic interrupt handler entrance process.

Then, in step S13, the periodic interrupt management unit 141x executes a periodic interrupt management process.

Then, in step S14, the periodic interrupt handler unit 130x executes a periodic interrupt handler output process.

FIG. 15 is a detailed flowchart of the periodic interrupt management process according to this embodiment.

In the periodic interrupt management process, each functional component unit to be executed as the periodic interrupt management process is invoked from the periodic interrupt management unit 141x.

In step S130, the start request unit 147 issues a start request to the core-1.

In step S131, the control processing unit 145x executes the control process.

FIG. 16 is a flowchart illustrating operation of the core-1 of the interrupt control apparatus 100b according to this embodiment.

Steps S20 to S24 are substantially the same as steps S1 to S5 in FIG. 3. In FIG. 16, the interrupt preparation process is described as the timer interrupt handler entrance process.

Description of Effects of this Embodiment

The interrupt control apparatus 100b according to this embodiment includes a multi-core processor equipped with two processors to process the interrupt process in parallel. The core-0, which is one processor of the two processors, includes the start request unit to regularly output a start request. The core-1, which is the other processor of the two processors, includes the time storage unit, the interrupt handler unit for the timer interrupt, the wait time period measurement unit, and the time calculation unit.

In this embodiment, substantially the same effects as those of the first embodiment can also be obtained in the interrupt control apparatus 100b constituted with the multi-core processor. That is, the interrupt time of a timer interrupt can be set such that a wait state is entered immediately before a periodic start request.

*Other Configurations*

The second and third embodiments can also be modified as described in the variations of the first embodiment.

In the first to third embodiments above, each unit of the interrupt control apparatus is described as an independent functional block. However, the configuration of the interrupt control apparatus may be different from the configurations in the above embodiments. Functional blocks of the interrupt control apparatus may be arranged in any configuration, provided that the functions described in the above embodiments can be realized. The interrupt control apparatus may be a system composed of a plurality of apparatuses, instead of a single apparatus.

Portions of the first to third embodiments may be implemented in combination. Alternatively, one portion of these embodiments may be implemented. Furthermore, these embodiments may be implemented as a whole or partially in any combination. That is, in the first to third embodiments, the embodiments can be freely combined, or any component of each embodiment can be modified, or any component can be omitted in each embodiment.

The embodiments described above are essentially preferable examples, and are not intended to limit the scope of the present invention, the scope of applications of the present invention, and the scope of intended uses of the present invention. The embodiments described above can be modified in various ways as needed.

REFERENCE SIGNS LIST

1: processor; 2: memory; 3: periodic signal interface; 4: control target interface; 5: multi-core processor; 6: core-0; 7: core-1; 8: shared memory; 100, 100a, 100b: interrupt control apparatus; 110, 110x, 110y: OS execution unit; 120, 120x, 120y: application processing unit; 130: interrupt handler unit; 130x: periodic interrupt handler unit; 130y: timer interrupt handler unit; 140: interrupt processing unit; 140x: periodic interrupt processing unit; 140y: timer interrupt processing unit; 141: interrupt management unit; 141x: periodic interrupt management unit; 141y: timer interrupt management unit; 142: wait time period measurement unit; 143: start request wait unit; 144: timing prediction unit; 441: time calculation unit; 442: time storage unit; 145, 145x, 145y: control processing unit; 451: control information input unit; 452, 452x, 452y: control process computation unit; 453: result output unit; 146: violation processing unit; 147: start request unit; 200: periodic signal device; 201: start request; 300: control target device; 500, 500b: interrupt control system; t1: start time; t2: end time

The invention claimed is:

1. An interrupt control apparatus to start an interrupt process in response to a start request generated regularly, the interrupt control apparatus comprising:
a memory to store an interrupt time at which an interrupt preparation process for preparing for the interrupt process is to be started; and
processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

2. The interrupt control apparatus according to claim 1, wherein the processing circuitry calculates, as the subtraction time period, a time period obtained by multiplying the wait time period by a threshold value representing a ratio.

3. The interrupt control apparatus according to claim 2, wherein the threshold value is one-half.

4. The interrupt control apparatus according to claim 1, wherein upon completion of the interrupt preparation process, the processing circuitry obtains a current time as a start time, treats a time at which the start request is generated as an end time, and measures a time period from the end time to the start time as the wait time period.

5. The interrupt control apparatus according to claim 2, wherein upon completion of the interrupt preparation process, the processing circuitry obtains a current time as a start time, treats a time at which the start request is generated as an end time, and measures a time period from the end time to the start time as the wait time period.

6. The interrupt control apparatus according to claim 3, wherein upon completion of the interrupt preparation process, the processing circuitry obtains a current time as a start time, treats a time at which the start request is generated as an end time, and measures a time period from the end time to the start time as the wait time period.

7. The interrupt control apparatus according to claim 4, wherein the processing circuitry determines whether the start request has been generated after completion of the interrupt preparation process and before acquirement of the start time, and when the start request has been generated, increases a next preparation time period to be longer than the preparation time period.

8. The interrupt control apparatus according to claim 5, wherein the processing circuitry determines whether the start request has been generated after completion of the interrupt preparation process and before acquirement of the start time, and when the start request has been generated, increases a next preparation time period to be longer than the preparation time period.

9. The interrupt control apparatus according to claim 6, wherein the processing circuitry determines whether the start request has been generated after completion of the interrupt preparation process and before acquirement of the start time, and when the start request has been generated, increases a next preparation time period to be longer than the preparation time period.

10. The interrupt control apparatus according to claim 1, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

11. The interrupt control apparatus according to claim 2, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

12. The interrupt control apparatus according to claim 3, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

13. The interrupt control apparatus according to claim 4, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

14. The interrupt control apparatus according to claim 5, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

15. The interrupt control apparatus according to claim 6, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

16. The interrupt control apparatus according to claim 7, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

17. The interrupt control apparatus according to claim 8, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

18. The interrupt control apparatus according to claim 9, further comprising
a multi-core processor including two processors to process the interrupt process in parallel,
wherein one processor of the two processors includes processing circuitry to regularly output the start request, and
the other processor of the two processors includes:
said memory to store an interrupt time at which an interrupt preparation process for preparing for the interrupt process is to be started; and
said processing circuitry to:
generate a timer interrupt at the interrupt time, and execute the interrupt preparation process;
measure a time period from completion of the interrupt preparation process to generation of the start request as a wait time period; and
calculate a subtraction time period based on the measured wait time period, calculate a preparation time period that is a sum of a time period obtained by subtracting the subtraction time period from the wait time period and a processing time period of the interrupt preparation process, and store a time obtained by shifting back the preparation time period from a time of a next start request, as a next interrupt time, in the memory.

19. An interrupt control method of an interrupt control apparatus to start an interrupt process in response to a start request generated regularly, the interrupt control apparatus including a memory to store an interrupt time at which an interrupt preparation process for preparing for the interrupt process is to be started, the interrupt control method comprising:
generating, using a processor, a timer interrupt at the interrupt time, and executing the interrupt preparation process;
measuring, using the processor, a time period from completion of the interrupt preparation process to generation of the start request as a wait time period; and
calculating, using the processor, a subtraction time period based on the measured wait time period, calculating a preparation time period that is a sum of a time period obtained by subtracting the subtraction time period from the wait time period and a processing time period of the interrupt preparation process, and storing a time obtained by shifting back the preparation time period from a time of a next start request, as a next interrupt time, in the memory.

20. A non-transitory computer readable medium storing an interrupt control program for an interrupt control apparatus to start an interrupt process in response to a start request generated regularly, the interrupt control apparatus including a memory to store an interrupt time at which an interrupt preparation process for preparing for the interrupt process is to be started, the interrupt control program causing a computer to execute:
an interrupt handler process of generating a timer interrupt at the interrupt time, and executing the interrupt preparation process;
a wait time period measurement process of measuring a time period from completion of the interrupt preparation process to generation of the start request as a wait time period; and
a time calculation process of calculating a subtraction time period based on the wait time period measured by the wait time period measurement process, calculating a preparation time period that is a sum of a time period obtained by subtracting the subtraction time period from the wait time period and a processing time period of the interrupt preparation process, and storing a time obtained by shifting back the preparation time period from a time of a next start request, as a next interrupt time, in the memory.

* * * * *